C. A. GRASSWICK.
MOTOR VEHICLE ATTACHMENT.
APPLICATION FILED MAY 23, 1919.

1,433,202.

Patented Oct. 24, 1922.

INVENTOR.
Carl A. Grasswick
BY
Hardway Cathey
ATTORNEYS.

Patented Oct. 24, 1922.

1,433,202

UNITED STATES PATENT OFFICE.

CARL A. GRASSWICK, OF HOUSTON, TEXAS.

MOTOR-VEHICLE ATTACHMENT.

Application filed May 23, 1919. Serial No. 299,332.

*To all whom it may concern:*

Be it known that CARL A. GRASSWICK, a citizen of the United States, residing at Houston, in the county of Harris and State of Texas, has invented certain new and useful Improvements in a Motor-Vehicle Attachment, of which the following is a specification.

This invention relates to new and useful improvements in a motor vehicle attachment.

One object of the invention is to provide a mechanism of the character described which has been specially designed for use on tractors, whereby the motor, under certain conditions, hereinafter set forth, will be automatically stopped or disconnected from the traction wheels. As is well known to those familiar with the operation of tractors, particularly tractors of a light type, when the tractor is overloaded, or is drawing a very heavy load, the traction wheels often can not be turned by the motor by reason of the load, and in such case, if the motor is strong enough, the front end of the tractor may be lifted, as the front end of the tractor, as commonly constructed is comparatively light, and when the load is so heavy that the power transmitted through the driving shaft can not rotate the traction wheels, the power transmitted through said shaft will operate, or have a tendency, to lift the front end of the tractor, and it is known that in many cases, the front end of the tractor has been lifted far enough to capsize backwardly, often injuring or killing the operator. It is the object of this invention to provide a tractor of the character described, having an automatic clutch release mechanism which will release the clutch and disconnect the motor from the traction wheels, when the forward end of the tractor is elevated, or which will stop the motor.

Another object of the invention is to provide a simple mechanism of the character described and for the purpose specified, which is positive in operation, which may be cheaply and easily manufactured and readily applied to any form of tractor.

With the above and other objects in view, the invention has particular relation to certain novel features of construction, operation and arrangement of parts, an example of which is given in this specification and illustrated in the accompanying drawings, wherein.

Figure 1:
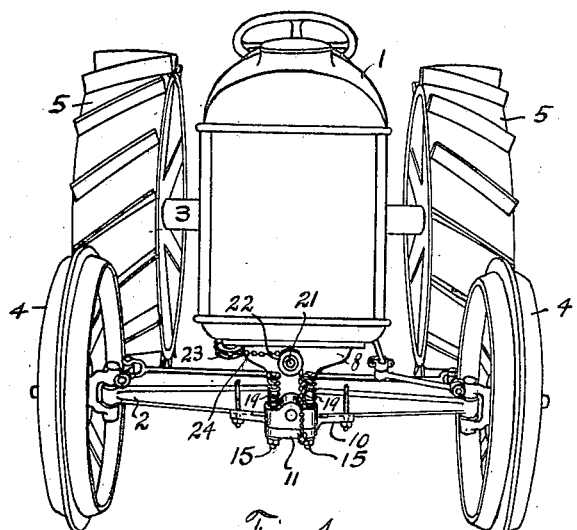
Figure 1 is a front view of the tractor showing the device applied thereto.
Figure 2:
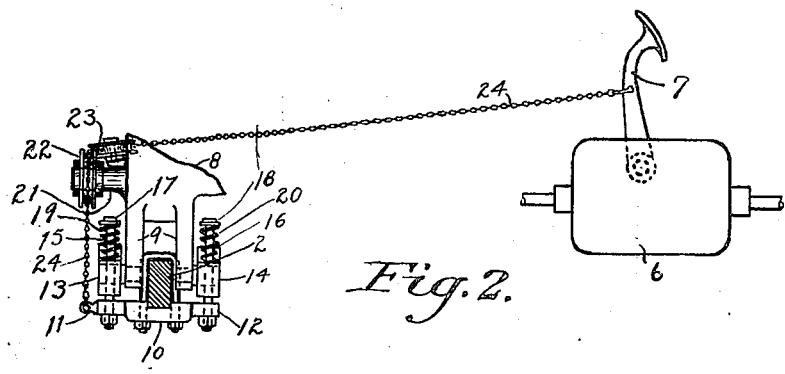
Figure 2 is a fragmentary view, showing the operative mechanism connected to the clutch pedal.

Referring now more particularly to the drawings, wherein like numerals of reference designate similar parts in each of the figures, the numeral 1 refers to the tractor body, mounted upon the front and rear axles 2 and 3, which, in turn, are sustained by the steering wheels 4, 4, and the traction wheels 5, 5, said traction wheels being operatively connected to and driven from the motor, in the usual and well known manner, and being connected thereto and disconnected therefrom by means of the clutch mechanism 6, which is operated through the clutch pedal 7. Depending from the front of the framework of the body 1, there is a bolster 8, which is forked forming the fingers 9, 9, which fit over the front axle 2. Bolted to the front axle underneath, there is the yoke 10 having the front and rear extensions 11 and 12, and resting upon these extensions, there are the front and rear bearing blocks 13 and 14, respectively, and upstanding from the respective extensions 11 and 12, are the bolts 15, 15, and 16, 16, upon which said respective blocks 13 and 14 are slidably mounted. The upper ends of these bolts 15 and 16 are formed into heads 17, 17, and 18, 18, and interposed between said heads and the respective blocks are the coil springs 19, 19, and 20, 20. The forward end of the frame has a pulley 22 mounted thereon, and the frame of the body also has the pulley 23 mounted at one side thereof. A cable 24 is attached at one end to the front extension 11 and passes over said pulleys, and is attached at its other end to the clutch pedal 7. The blocks 13 and 14 are anchored to the respective fingers 9, 9, so that in case the traction wheels 5, 5, should by reason of the load or for any other reason be held against rotation, and the forward end of the body of the tractor for that reason be lifted by the power of the motor, the bolster 8 and the fingers 9, 9, will move upwardly relatively to the front axle, the blocks 13 and 14 sliding upward on the bolts 15 and 16, upon which they have bearings and the pulleys 22 will thereby exert a pull on the cable 24, which will operate through the pedal 7, to declutch the engine from the traction wheels, thus making it impossible for the tractor to be capsized backwardly through the power delivered through the driving shaft from the motor.

The attachment may be arranged, as well, to stop the motor, instead of releasing the clutch. This may be accomplished by attaching the cable 24 to the arm of the throttle valve so as to close said valve when the front end of the frame is elevated; or by attaching said cable to a switch of the ignition system, so as to short circuit the electric current when the front end of the frame is elevated.

What I claim is:

1. A motor vehicle, having a front and a rear axle, and guide and tractor wheels supporting said axles, a clutch through which the motor may be connected with and disconnected from said tractor wheels, a device operatively connected with the clutch pedal and the front axle through which the vertical movement of the body relative to said axle operates to disconnect said clutch.

2. A tractor including a front and a rear axle, steering and tractor wheels supporting their respective axles, a body supported by said axles, the front end of said body being vertically movable relatively to the front axle, a clutch through which the motor may be operatively connected with and disengaged from said tractor wheels and a device connected to the clutch operating lever and to the front axle, and actuated by the vertical movement of the body relative to the front axle to disengage said clutch.

3. A tractor including axles, traction wheels supporting one axle, steering wheels supporting the other axle, a body supported on the axles and vertically movable with respect to one of them, a clutch mechanism for operatively connecting the motor with and disengaging it from the traction wheels, and a device actuated by the vertical movement of the body relative to the last mentioned axle and adapted to disengage said clutch mechanism.

4. A tractor including axles, traction wheels supporting one axle, steering wheels supporting the other axle, a body supported on the axles and vertically movable with respect to one of them, a clutch mechanism for operatively connecting the motor with and disengaging it from the traction wheels, a device actuated by the vertical movement of the body relative to the last mentioned axle and adapted to disengage said clutch mechanism, said device including a cable attached at one end to said last mentioned axle and at its other end to the operating lever of said mechanism and a pulley over which the cable operates.

5. A motor vehicle having a frame, guide and tractor wheels supporting the same, said frame being capable of vertical movement relative to the guide wheels, a motor connected to the tractor wheels whereby the same are rotated and a device arranged to be actuated by the vertical movement of the frame relative to the guide wheels, whereby the delivery of power from said motor to the traction wheels is suspended.

6. A traction machine having its frame mounted for vertical movement on the forward axle actuated by power of the motor, and mechanism actuated through such movement for rendering the motor inoperative to drive the machine.

In testimony whereof he has signed his name to this specification in the presence of two subscribing witnesses.

CARL A. GRASSWICK.

Witnesses:
E. V. HARDWAY,
WM. A. CATHEY.